June 7, 1938.  J. B. RICKARDS ET AL  2,120,190
CASTING REEL
Filed Jan. 25, 1937  2 Sheets-Sheet 1
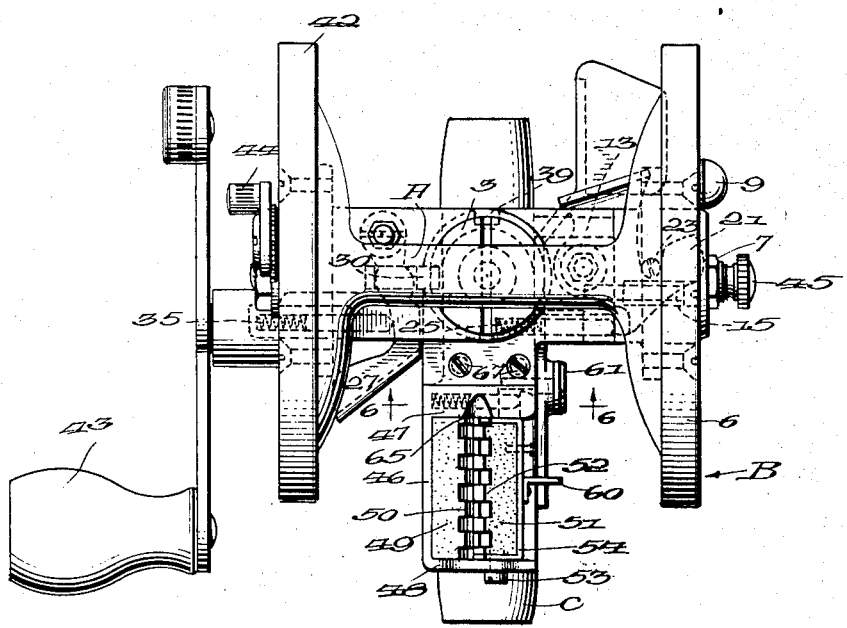
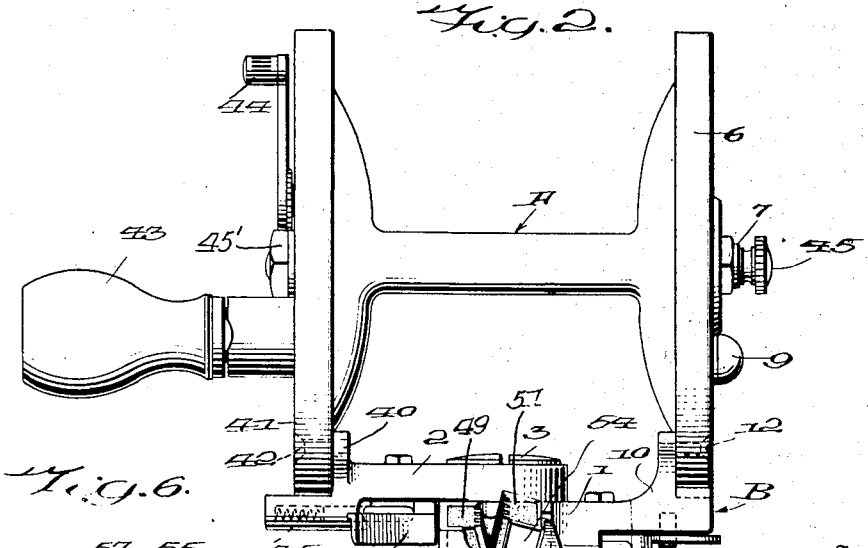
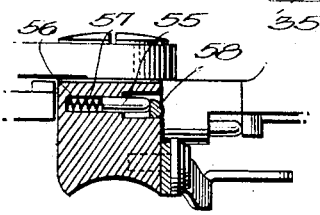
Inventor
Joshua B. Rickards
and John E. J. Spencer,
By Smith, Michael & Gardiner
Attorneys.

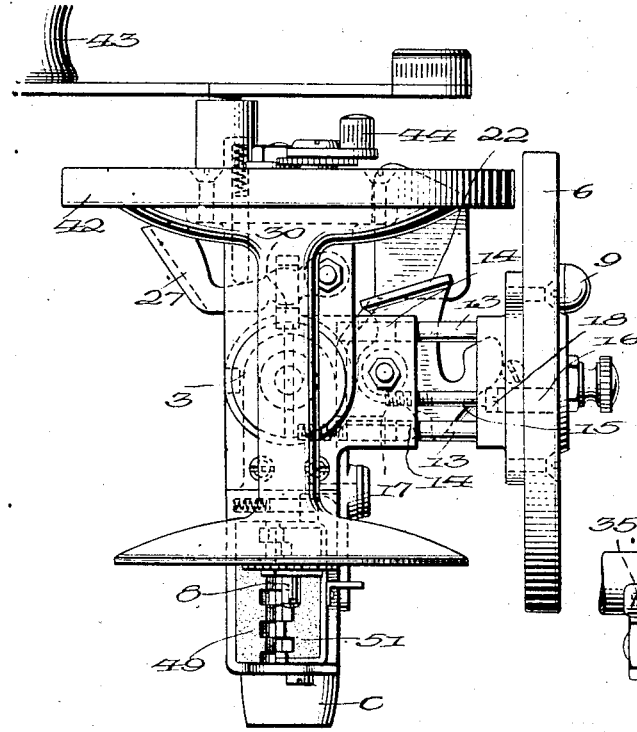

Patented June 7, 1938

2,120,190

UNITED STATES PATENT OFFICE 2,120,190

CASTING REEL

Joshua B. Rickards and John E. J. Spencer, Philadelphia, Pa.

Application January 25, 1937, Serial No. 122,242

14 Claims. (Cl. 242—84.1)

This invention relates to reels and more particularly to casting reels which are designed to prevent back-lash due to overrunning of the reel while making a cast.

In the ordinary reel, the spool of which is journaled for rotation during casting, it is common practice to use the thumb of the hand gripping the rod to brake rotation of the spool, which often causes burning of the thumb, retards distance and unless properly thumbed causes back-lash and it is difficult to apply the proper pressure to the reel to permit of accurate casting.

The present invention is designed to eliminate rotation or spinning of the reel during the casting operation, and is accomplished by turning the reel from a position in which its axis of rotation is transverse of the fishing rod to a position in which the axis of the reel is substantially parallel with the rod. The reel is then locked in this position and held against rotation so that when the cast is made the line feeds from the end of the spool. In this manner no overrunning of the spool can take place, and consequent backlash with attendant difficulties such as loss of hook and sinkers, entangling of line, etc., is avoided.

One of the objects of our invention is to provide a support for the spool that can be quickly adjusted to either the normal fishing position or to the casting position, in the latter of which one end of the spool is unsupported, thereby making possible easy withdrawal of the line over this unsupported end thereof.

Another object is to provide a support for the spool proper which may be securely locked in either its normal or casting position.

Another feature of the invention resides in the manner of mounting the spool so that in normal position it is supported at both ends for rotation, while in casting position the support for one end of the spool is removed in order to permit turning of the spool through ninety degrees and into casting position.

Still another object of our invention is to provide means to permit the spool to run freely when in casting position or in position for conventional use.

A further object is to provide a brake for the line being fed from the spool and provided with an operating handle positioned for ready operation by the user.

Other objects and advantages will appear as the description proceeds.

Referring now to the drawings which form part hereof and in which corresponding numerals are used throughout:

Figure 1 is a plan view of our invention when positioned for use in the ordinary manner, i. e., with the axis of the reel at right angles to the axis of the rod.

Fig. 2 is a side elevation of Fig. 1.

Fig. 3 is a plan view with the reel in casting position.

Fig. 4 is a bottom plan view of the reel when in normal position.

Fig. 5 is an end elevation when viewed from the left of Fig. 2, and

Fig. 6 is a fragmentary sectional view on the line 6—6 of Fig. 1.

In the drawings we have disclosed the spool proper A supported in a cradle B which is adapted to be attached to a fishing pole by means of the conventional cross plate C.

The cradle B consists of sections 1 and 2 which are pivoted together for relative rotation by means of a central bolt 3 passing through suitable apertures therein and screw-threadedly engaging the cross bar C.

The section 1 of the cradle B lies below the section 2 so that the sections may rotate relative to each other and the bolt head is countersunk into the top surface of the section 2 so as to offer no obstruction to the line paying out from the spool.

The section 1 is designed to carry a sliding head 6 of the cradle which carries the journal bearing 7 for supporting one end of the shaft 8 on which the spool rotates, and in addition carries the conventional indicating mechanism 9 of the "click" type, which need not be described since it forms no part of this invention.

It will be apparent that section 1 of the cradle B is made up of a stationary portion and a slidable end portion 10 with the slidable portion provided with an upstanding flange 11 to which the head 6 is secured by means of suitable fastenings such as screws 12, so that the head 6 and slidable portion 10 move together.

It is understood, of course, however, that the head 6 may be secured to the slidable portion 10 in any suitable manner.

The slidable portion 10 is mounted for movement with reference to the stationary portion of the section 1 by means of rods 13 carried by the portion 10 and passing into sockets 14 in the stationary portion of section 1. A suitable stop member 15 is removably carried by section 1 and operates in a socket 16 in the slidable portion 10 to limit outward movement of the head 6 and prevent accidental removal of said head. The stop member 15 is illustrated as a bolt threaded into the section 1 as at 17 and being provided with a limiting head 18, but of course it may take other forms.

From the foregoing it will be seen that the head 6 and the sliding portion 10 may be moved a limited extent which is sufficient to release one end of the shaft 8 from the journal bearing 7, as clearly shown in Fig. 3, and when in such position the spool A may be swung through an arc of 90 degrees about the pivot bolt 3 so as to position the axis of rotation of the spool in parallelism with the fishing rod.

In order to lock the head 6 and sliding portion 10 in its shaft supporting position, there is provided on the section 1 a spring-pressed latch 19 which is pivoted at 20 and is provided with a hook 21 and an operating handle 22.

On the sliding portion 10 a depending stud 23 is formed which is engaged by the hook 21 when the head 6 is in its inner or shaft supporting position so that the head 6 is locked in this position. The latch 19 is biased to locking position by a plunger 24 which is urged into engagement with the latch by means of a spring 25 mounted in a socket in section 1.

It will be noted that the nose or hook 21 lies behind the studs 23 when the head 6 has been moved to disengage it from the shaft (Fig. 3) and prevents accidental sliding movement of the head when the spool is in casting position.

In moving the spool to casting position it will be seen from an inspection of Fig. 3 that section 1 and the head 6 maintain their position at right angles to the fishing pole, whereas the section 2 pivots about the bolt 3 and disposes the shaft 8, which is fixedly carried by the section 2, in parallelism with the fishing rod.

Swinging section 2 of the cradle is provided with a depending boss 26 to which is pivoted an operating lever 27 as at 28, and terminates in a finger piece 29.

A locking bolt 30 is slidably mounted in a recess 31 in the boss 26 and is provided with a groove 32 receiving therein the rounded portion 33 of the lever 27, as shown in Fig. 4. The locking bolt, therefore, being disposed between the lever 27 and the bottom of section 2, is held in the recess 31 and is free to slide therein upon swinging the lever 27.

A plunger 34 is urged into engagement with the lever 27 by means of a spring 35 mounted in a socket 36 on section 2 so that the bolt 30 is normally biased to locking position.

Section 1 of cradle B is provided with a rounded corner 37 and has spaced slots 38 and 39 therein (Fig. 4) which receive the locking bolt 30 as the reel is moved to either its normal or its casting position.

It is understood, of course, that slots 38 and 39 are so spaced as to permit the spool A to be swung through 90 degrees and then locked in position at the end of such movement.

From an inspection of Fig. 2 it will be seen that section 2 is provided with a flange 40 to which is secured the head 41. These parts are attached by any suitable means such as screws 42.

Head 41 is provided with the usual gearing connecting the reel handle 43 with the spool by means of which the spool is rotated, but since the particular arrangement of gearing is not a portion of this invention, it has not been illustrated.

A clutch operating handle 44 by means of which the spool may be disconnected from the gearing is also shown, but as this is of conventional construction, further discussion is not believed necessary.

It will be apparent that the head 41 permanently supports the shaft 8 so that the shaft, spool and head swing together, the shaft being supported in the head 41 by means of a nut 45' screwed onto the end thereof. It will be clearly apparent from the foregoing that when the spool A is swung from its normal position of Fig. 1 to the position disclosed in Fig. 3, when the locking bolt 30 registers with either of the slots 38 or 39, the spring automatically projects the latch into the slot and locks the spool in either of its positions.

In addition to the foregoing, there is provided a brake for the fishing line being fed from the spool, said brake mechanism being formed integrally with the cross plate C, as clearly shown in Fig. 5.

The brake is disposed so as to align with the fishing rod and consists of vertically extending walls 46, 47, and 48, constituting end walls and one side wall of a socket. Disposed within the socket is a stationary brake jaw 49 of fibrous or other material which is provided with teeth 50.

Pivotally mounted adjacent the fixed brake jaw 49 is a swinging brake jaw 51 likewise formed of fibrous or similar material and being provided with teeth 52. The swinging brake jaw is pivoted about the axis 53 and is carried in a yoke 54 which extends over the back and end walls of the movable jaw.

The fixed and movable brake jaws are carried in their respective members by a frictional fit so that they may be readily removed for purposes of renewal.

From an inspection of Fig. 2 it will be seen that the jaws 49 and 51 are normally spaced so as to permit the line to pass freely between the same. The jaws are held in spaced relation due to the fact that the movable jaw 51 is spring-biased away from the fixed jaw by means of a spring-pressed plunger 55 operating in a socket 56 and normally urged out of the socket by a spring 57, as clearly shown in Fig. 6.

The plunger 55 yieldingly engages an arm 58 extending rearwardly from the yoke 54, as clearly shown in Fig. 5, it being noted that the arm 58 extends into a recess 59 formed in the end wall 47 and in which the plunger 55 operates.

From the foregoing it will be seen, therefore, that the spring 57 urges the arm 58 and consequently the yoke 54 which carries the movable brake jaw 51, away from the fixed brake jaw 49.

In order to operate the movable brake jaw so as to engage the line passing therethrough, there is provided on the yoke 54 a laterally extending abutment 60 which projects to one side of the cross plate C. Pivotally secured to the side of the cross plate C as at 61, is a lever 62 having one of its ends terminating in a finger piece 63 and its other end 64 engaging the abutment 60.

By operation of the lever 62 the abutment 64 will cause the movable brake jaw 51 to move against the action of the spring 56 and thereby clamp the line between the movable and fixed elements, and upon release of the finger piece 63 the spring 56 immediately returns the movable jaw to its inoperative position.

In order to afford an opportunity for the line to pass between the jaws, the upper surface of the wall 47 is provided with an inclined guide groove 65 for directing the line downwardly between the jaws of the brake, and the end wall 48 is cut away as at 66 (Fig. 2) so as to permit the line to penetrate deeply between the jaws and be effectively engaged thereby upon operation of the lever 62.

It is apparent that the cross plate C, the brake jaws and the brake operating mechanism are a unitary device, which may be attached to and removed from the section 1 by releasing the pivot bolt 3 and removing the screws 67 without disturbing the other portions of the reel.

In operation the reel is supported in the position shown in Fig. 1, in which the axis of rotation of the spool is at right angles to the axis of the fishing rod, which is the position for normal use. However, when it is desired to use the reel for casting purposes, the latch 19 is operated to release the stud 23 from the hook 21, so that the head 6 may be moved to withdraw the bearing 7 from the end of the shaft 8; this movement of the head 6 being limited by the stop member 15 and positioning the head 6 out of the path of travel of the spool during its swinging movement.

After the head 6 has been moved to the position shown in Fig. 3, the finger piece 29 is actuated to withdraw the locking bolt 30 from the slot 38, after which the entire section 2 of the cradle carrying with it the head 41 and spool A, is swung about the bolt 3 until the locking bolt 30 snaps into the slot 39 due to the action of the spring 35. The reel is then supported and locked in the position shown in Fig. 3.

When in this position and a cast is made, it will be seen that the line will feed off of the unsupported end of the spool A and that rotation of the spool to permit paying out of the line is unnecessary, and that consequently longer and more accurate casts can be made due to the fact that substantially no friction is encountered as in the case where the spool must rotate to permit withdrawal of the line.

When it is desired to restore the reel again to normal position the operations previously described are reversed, that is to say, the finger piece 29 is operated to remove the lock bolt 30 from the slot 39, after which the section 2 is rotated in a reverse direction about the pivot 3 until the lock bolt 30 snaps into the slot 38. The latch 19 is thereupon operated to remove the nose portion 21 thereof from behind the stud 23 and head 6 moved inwardly to the position shown in Fig. 1, at which time the latch 19 engages the stud and locks the head in this position with the bearing 7 of the head 6 engaging the end of the shaft 8.

From the foregoing it will be seen that a very compact and efficient structure has been devised which can be quickly and easily converted from the standard free spool casting reel into a non-back-lash casting reel and which reduces friction on the line to a minimum. Furthermore, that the reel is locked in either its normal position or in its casting position so that there is no danger of the reel swinging during a casting operation.

The present invention has been described with reference to its use as a fishing reel, but of course it may be used in other fields, such as transferring a hawser line from dock to ship, or it may be attached to a rifle or gun for use in shooting a line aboard ship or for steeple jack and rigging, lumbering, transmission lines, coast guard rescue work.

It is to be understood that while it is preferable to make the mounting and its associated parts of metal, various materials may be used, and while we have disclosed a preferred embodiment of the invention, the construction and arrangement of parts may be varied so long as they do not depart from the spirit or scope of the hereunto appended claims.

The reel is intended for other uses such as the textile field of rayon, silk, yarn, wool, cordage, etc., for winding. The flanged metal spool is removed and cores are substituted which are removable. This gives the cores support at both ends when winding.

The reel can be operated by hand or equipped with a small motor.

What we claim as new and desire to secure by Letters Patent is:

1. In a casting reel provided with a spool shaft, the combination with a support for said shaft, said support including bearings for each end of the shaft, means for locking the bearings in alignment, means for releasing one of the bearings for movement into non-supporting position, and means for releasing the other bearing for movement to a position at right angles to the first shaft bearing.

2. In a casting reel carrying a spool shaft, a support for said shaft comprising a pivoted bearing at one end, and an axially movable bearing at the other end, means for locking the movable bearing in alignment with the stationary bearing, means for releasing the lock whereby the movable bearing may be moved out of engagement with the shaft, and means for releasing the pivoted bearing for movement about the pivot.

3. In a casting reel carrying a shaft, a support for said shaft including bearings for opposite ends thereof, a slide carrying one of said bearings, means for releasing the slide for movement to disengage the bearing carried thereby from the shaft, and means for releasing the other bearing for movement to a position at right angles to the first bearing.

4. In a casting reel carrying a shaft, a support for said shaft including aligned bearings for opposite ends thereof, a slide carrying one of said bearings, means for releasing the slide to disengage the bearing carried thereby from the shaft, means for releasing the support for the other bearing for movement to a position at right angles to the first bearing, and means for locking the said other bearing in both positions.

5. In a casting reel carrying a shaft, a support for said shaft comprising a sectional cradle provided with bearings for opposite ends of the shaft, means for permanently mounting one end of the shaft in one of the bearings, means for moving the other bearing out of engagement with the shaft, the sections of the cradle being pivotally connected whereby the bearing permanently carrying the shaft may be swung to dispose the shaft at right angles to the other bearing.

6. In a casting reel carrying a shaft, a support for said shaft comprising a sectional cradle provided with bearings for opposite ends of the shaft, means for permanently mounting one end of the shaft in one of the bearings, means for moving the other bearing out of engagement with the shaft, the sections of the cradle being pivotally connected whereby the bearing permanently carrying the shaft may be swung to dispose the shaft at right angles to the other bearing, and means for locking the swinging section in either or both of its positions.

7. In a casting reel carrying a shaft, a support for said shaft comprising a sectional cradle provided with bearings for opposite ends of the shaft, means for permanently mounting one end of the shaft in one of the bearings, means for moving the other bearing out of engagement with the shaft, the sections of the cradle being pivotally connected whereby the bearing permanently carrying the shaft may be swung to dispose the shaft at right angles to the other bearing, means for locking the swinging section in either or both of its positions, and a brake carried by one of said sections and engageable with the line being fed from the reel.

8. In a casting reel for use upon a rod, a spool normally locked with its axis transverse of the axis of the rod, means for pivotally mounting said spool for swinging movement into position with its axis in parallelism with said rod, and a brake on said reel, said brake comprising spaced jaws having the space therebetween extending in parallelism with the rod whereby the line being fed from the spool may be engaged by the brake when the spool is in either of its adjusted positions.

9. In a casting reel, a spool shaft having a pivoted bearing at one end, a bearing for the other end movable into and out of engagement therewith, and means permitting swinging of the spool shaft through ninety degrees when the movable bearing is disengaged from the spool shaft.

10. In a casting reel having a spool shaft, a plate for attachment to a rod, a support rigid with the plate and carrying a slidable bearing thereon for one end of the shaft, a bearing for the other end of the shaft pivotally attached to said support and having a shaft permanently carried thereby, and means for releasing the slidable bearing for movement out of engagement with the shaft whereby the other bearing and the shaft may be swung about a pivot.

11. In a casting reel having a spool shaft, a plate for attachment to a rod, a support rigid with the plate and carrying a slidable bearing thereon for one end of the shaft, a bearing for the other end of the shaft pivotally attached to said support and having a shaft permanently carried thereby, means for releasing the slidable bearing for movement out of engagement with the shaft whereby the other bearing and the shaft may be swung about a pivot, and means for locking the bearings in either or both positions.

12. In a casting reel carrying a shaft, a support for said shaft comprising a sectional cradle provided with bearings for opposite ends of the shaft, means for permanently mounting one end of the shaft in one of the bearings, means for moving the other bearing out of engagement with the shaft, the sections of the cradle being pivotally connected whereby the bearing permanently carrying the shaft may be swung to dispose the shaft at right angles to the other bearing, and means for locking the swinging section in either or both of its positions.

13. In a casting reel having a spool shaft, a plate for attachment to a rod, a support rigid with the plate and carrying a slidable bearing thereon for one end of the shaft, a stop for limiting the sliding movement of said bearing, a bearing for the other end of the shaft pivotally attached to said support and having a shaft permanently carried thereby, and means for releasing the slidable bearing for movement out of engagement with the shaft whereby the other bearing and the shaft may be swung about a pivot.

14. In a casting reel having a spool shaft, a plate for attachment to a rod, a support rigid with the plate and carrying a slidable bearing thereon for one end of the shaft, a bearing for the other end of the shaft pivotally attached to said support and having a shaft permanently carried thereby, a lock for the slidable bearing and a lock for said pivoted bearing both urged to locking position, and means for releasing both locks whereby the slidable bearing may be disengaged from the shaft and the other bearing swung about a pivot.

JOSHUA B. RICKARDS.
JOHN E. J. SPENCER.